United States Patent [19]
Ashida

[11] Patent Number: 4,801,899
[45] Date of Patent: Jan. 31, 1989

[54] QUADRATURE AMPLITUDE MODULATION/DEMODULATION DEVICE USING MULTI-LEVEL DIGITAL SIGNALS

[75] Inventor: Hideo Ashida, Otawara, Japan

[73] Assignee: Fujutsu Limited, Kawasaki, Japan

[21] Appl. No.: 941,370

[22] Filed: Dec. 15, 1986

[30] Foreign Application Priority Data

Dec. 17, 1985 [JP] Japan .................................. 60-283290

[51] Int. Cl.$^4$ ....................... H04L 27/20; H04L 27/22
[52] U.S. Cl. ......................................... 332/17; 329/50;
329/135; 329/204; 332/18; 332/21; 375/39;
375/60; 375/99
[58] Field of Search ....................... 332/17, 18, 21, 22,
332/23 A, 40, 41; 329/112, 50, 122, 124, 204,
135; 375/39, 60, 99; 455/60, 63, 108, 312, 337

[56] References Cited
U.S. PATENT DOCUMENTS

4,581,748   4/1986   Sasaki et al. ....................... 332/17 X
4,633,484  12/1986   Takeda et al. ...................... 375/39 X Primary Examiner—Siegfried H. Grimm
Attorney, Agent, or Firm—Staas & Halsey

[57] ABSTRACT

A modulation device using multi-level digital signals includes: a pair of balanced mixers for carrying out quadrature amplitude modulation to deliver a quadrature amplitude modulated signal; input and output hybrid circuits, connected to carrier input terminals of the pair of balanced mixers, for supplying carrier inputs to the pair of balanced mixers; and a modulation characteristic compensation unit connected with input terminals of the pair of balanced mixers for supplying the pair of balanced mixers with orthogonal baseband input signals. A demodulation device with a use of multi-level digital signals including: a pair of balanced mixers for carrying out quadrature amplitude demodulation to deliver a pair of quadrature amplitude demodulated signals; first and second input hybrid circuits; and a demodulation characteristic compensation unit connected with output terminals of the pair of balanced mixers for deriving demodulation characteristic compensated orthogonal baseband signals from the pair of quadrature amplitude demodulated signals.

2 Claims, 7 Drawing Sheets

16-VALUED QUADRATURE AMPLITUDE MODULATION

Fig. 8 ly digital signals; that is, digital signals having one of a plurality of predetermined levels corresponding to data. The invention more particularly relates to a QAM modulation/demodulation device for carrying out an addition of quadrature components according to a definite functional relationship therebetween, to improve the linearity of modulation and demodulation characteristics.

QUADRATURE AMPLITUDE MODULATION/DEMODULATION DEVICE USING MULTI-LEVEL DIGITAL SIGNALS

BACKGROUND OF THE INVENTION

1. Field of the Invention

The present invention relates to a quadrature amplitude modulation/demodulation device for multi-level digital signals; that is, digital signals having one of a plurality of predetermined levels corresponding to data. The invention more particularly relates to a QAM modulation/demodulation device for carrying out an addition of quadrature components according to a definite functional relationship therebetween, to improve the linearity of modulation and demodulation characteristics.

2. Description of the Related Arts

In general, a method of representing bits or characters by shifting, with respect to a reference, the phase of a carrier wave by an amount corresponding to each type of character, is adopted in a communication system. The transition from one phase state to another is achieved by maintaining a constant amplitude while the signal passes through intermediate phases at an angular rate determined by the phase excursion involved and a shaping function that may be defined. Thus, phase-shift keying (PSK) is angle modulation in which a sinusoidal carrier is switched between two phase states by the transition of a digital data stream. It is actually a digital transmission in which the phase of the carrier is discretely-varied in relation either to a reference phase, or to the phase of the previous signal element, in accordance with the data that is to be transmitted.

When four phase states or positions in the time or frequency domains exist within a single period, this is regarded as a quadrature phase-shift keying (QPSK) or a quadrature amplitude modulation (QAM). For instance, a multiple phase shift keying is used in a modulation system in which there are as many phase states of a carrier as there are digital information input code elements to represent.

In general, a balanced mixer with diodes is used as a fundamental circuit for a multi-level modulation/demodulation device, in order to obtain a high frequency modulated wave from a baseband signal or vice versa.

A balanced mixer and a sixteen-level quadrature amplitude modulation (QAM) modulator/demodulator device will be described with reference to FIG. 1. In the figure, numeral 11 denotes a balanced mixer which is composed of balanced transformers 111 and 112, a diode bridge 113 having four diodes, a pair of local carrier input terminals a and a', a pair of baseband input/output terminals $A_0$ and $A_0'$ and a pair of baseband input/output terminals $B_0$ and $B_0'$. When a local carrier input is applied to the balanced mixer 11 from a pair of terminals and a baseband A input is applied to the neutral points $N_1$, $N_2$ of the balanced transformers 111, 112 from a pair of input terminals $A_0$ and $A_0'$, then a modulated signal of a carrier frequency is obtained from the output terminals by a modulation operation. On the contrary, if a modulated carrier frequency is applied to a pair of terminals b and b', a demodulation operation is carried out to obtain a baseband output from the terminals Ao and Ao'.

Further, a multi-level modulation/demodulation device will be realized by means of a combination of a plurality of balanced mixers.

Figure 1:
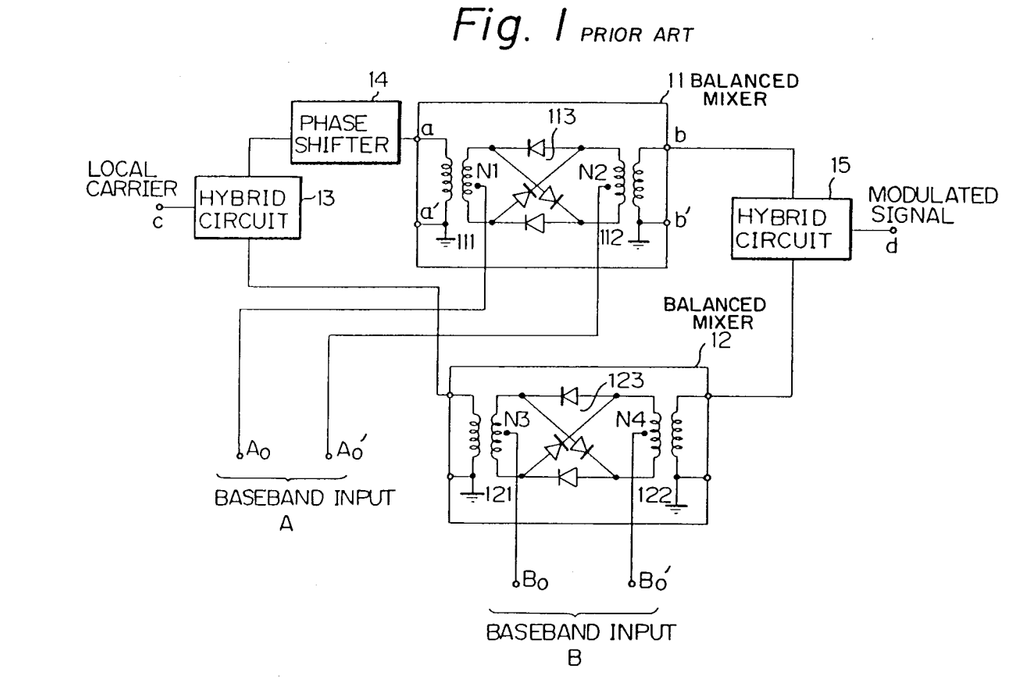
FIG. 1 is a circuit diagram of a prior art 16-level quadrature amplitude modulation type modulation/demodulation device.

FIG. 1 shows an example of a whole constitution of a 16-level quadrature amplitude modulation system modulator/demodulator device.

Numerals 13 and 15 denote hybrid circuits, 11 and 12 balanced mixers, and 14 denotes a 90 degrees phase shifter.

In FIG. 1, a local carrier input is applied from a terminal c and is divided into two parts at a hybrid circuit 13. One part of the input is applied to a balanced mixer 11 through a 90° phase-shifter 14, and the other part is applied directly to a balanced mixer 12. When a baseband input A is applied to the balanced mixer 11 from terminals $A_0$, $A_0'$ and a baseband input B is applied to the balanced mixer 12 from terminals $B_0$, $B_0'$, a multi-level modulation is carried out to obtain a high frequency multi-level modulated signal output composed of 16-level QAM signals at the output terminal d of the hybrid circuit 15, which composes the outputs of both balanced mixers 11 and 12. On the contrary, if a 16-level QAM multi-level modulated wave input is applied to terminal d, a demodulation operation is carried out to obtain a baseband output A and B, respectively, at the terminals $A_0$, $A_0'$ and $B_0$, $B_0'$.

In a multi-level modulation/demodulation device as shown in FIG. 1, if the balanced mixer characteristic is ideal, the amplitude of the baseband signal and the phase of the high frequency multi-level modulated signal are not related to each other, so the amplitude of both signals is completely in a proportional relationship. In reality, it is quite difficult to keep the linearity of such modulation and demodulation characteristics at the high input level.

Figure 2:
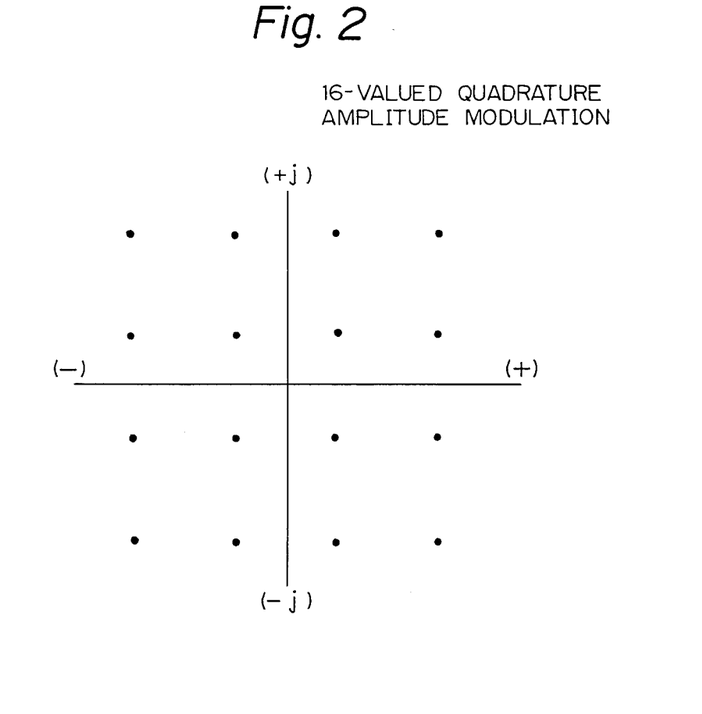
FIG. 2 is a fundamental diagram of a 16-level quadrature amplitude modulation.

FIG. 2 is a fundamental diagram of 16-level QAM (4 points every quadrant).

Figure 3:
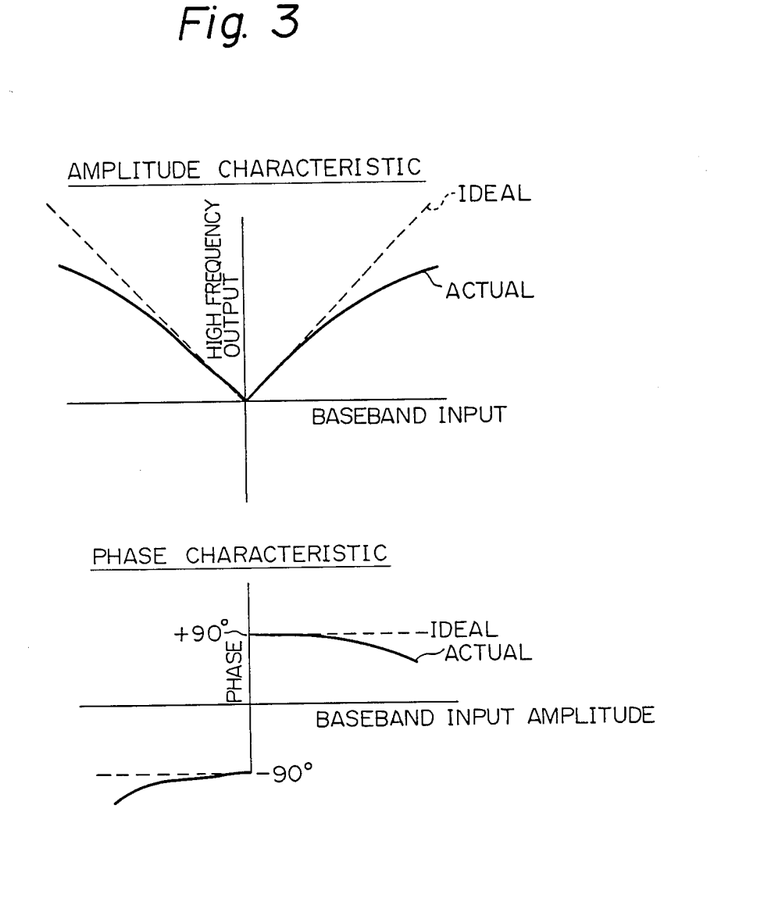
FIG. 3 shows an amplitude and phase characteristic of a balanced mixer.
Figure 4:
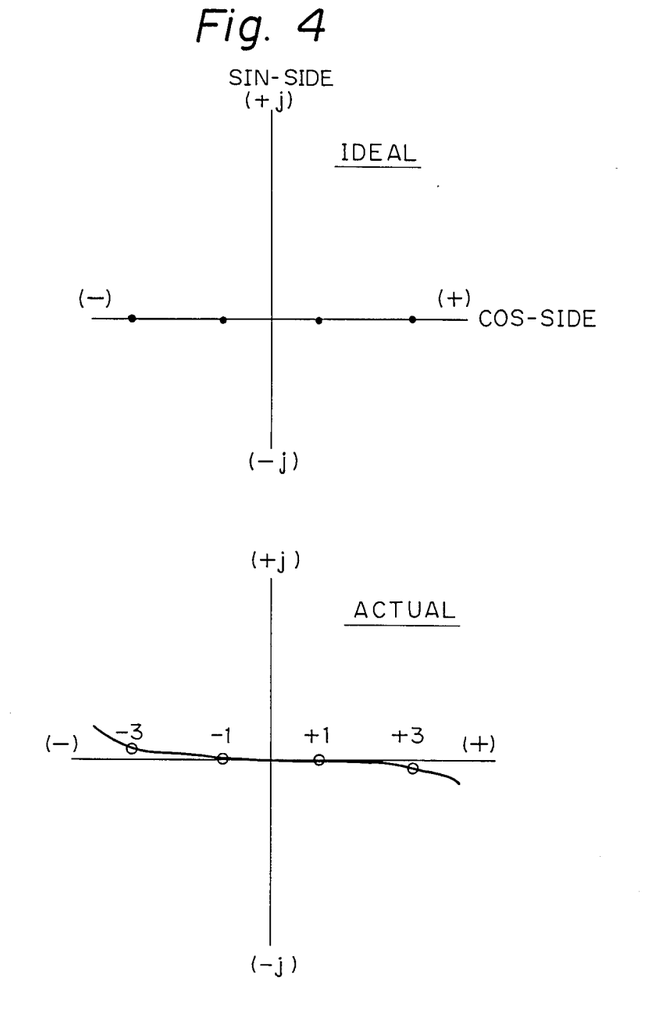
FIG. 4 is a vector phase diagram of the balanced mixer.

FIG. 3 and FIG. 4 denote an example of modulation and demodulation characteristics in an equivalent mixer. More particularly, FIG. 3 shows amplitude characteristics in the upper diagram and phase characteristics in the lower diagram.

In the figure, the upper diagram shows a baseband input amplitude versus high frequency output characteristics. The lower diagram shows a baseband input amplitude versus phase characteristics. In both diagrams a solid line represents an actual value and a broken line a desired value.

FIG. 4 shows a cos side input versus sine side output characteristics on a vector plane. On account of this characteristic, as the baseband input increases, the phase and amplitude of the high frequency output vector depart from the desired liner characteristic. In FIGS. 3 and 4, if demodulation is desired, the same characteristics will be obtained with regard to demodulation, where the input/output relationship of the baseband signal versus the high frequency signal is conversely illustrated but the characteristics is equivalent.

Figure 5:
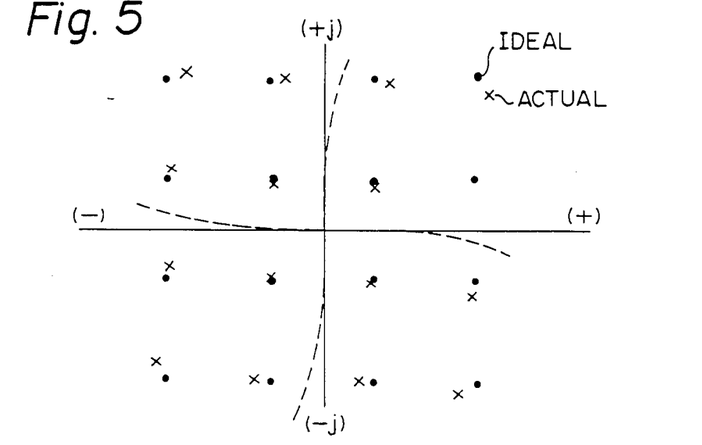
FIG. 5 is a diagram of a 16-level QAM modulation/demodulation characteristic.

FIG. 5 is a characteristic diagram of 16-level quadrature amplitude modulator composed of balanced mixers having such non-linear characteristics. If the characteristics of the balanced mixer are ideal or show the desired values, the characteristics of the 16-level QAM modulator/demodulator are represented by the 16 points of the mark (.), but if the balanced mixer having a non-linear characteristic is used, 16-level QAM modulator/demodulator characteristics are represented by the 16 points of another mark (*), and an ideal modulation/demodulation characteristic cannot be obtained.

In the prior art, the level of the baseband signal is lowered to obtain approximately ideal characteristics. But when such a method is adopted not only is the loss in a modulator/demodulator (or modulation/demodulation loss) increased, but also the leakage of local signals cannot be avoided when there is an unbalance in the balanced mixer. As a result the relative value of the output signal level is reduced.

SUMMARY OF THE INVENTION

It is an object of the present invention to provide a multi-level modulation/demodulation device wherein to a modulation/demodulation baseband signal is added a compensating signal which is composed of another baseband signal according to a definite functional relationship, to accomplish the compensation of non-linearity characteristics and to obtain a multi-level modulation/demodulation device having an excellent linearity during modulation/demodulation.

Therefore, according to the present invention, there is provided a modulation device using multi-level digital signals including: a pair of balanced mixers for carrying out quadrature amplitude modulation to deliver a quadrature amplitude modulated signal; an input hybrid circuit for connecting carrier input terminals of the pair of balanced mixers and supplying carrier inputs to the pair of balanced mixers; an output hybrid circuit for connecting modulated output terminals of the pair of balanced mixers and delivering modulated outputs from the pair of balanced mixers; and modulation characteristic compensation means connected to modulation input terminals of the pair of balanced mixers for supplying the pair of balanced mixers with orthogonal baseband input signals; the modulation characteristic compensation means including a pair of compensation signal generating circuits and a pair of addition circuits for adding baseband input signals and compensation signals generated in the pair of compensation signal generating circuits; the addition in each addition circuit in the pair being such that a value which is a function of one of said baseband input signals is added to the other of the baseband input signals.

According to an alternative feature of the present invention, there is provided a demodulation device using multi-level digital signals including: a pair of balanced mixers for carrying out quadrature amplitude demodulation to deliver a pair of quadrature amplitude demodulated signals; a first input hybrid circuit for connecting modulated signal input terminals of the pair of balanced mixers and supplying modulated signal inputs to the pair of balanced mixers; a second input hybrid circuit for connecting carrier input terminals of the pair of balanced mixers and supplying carrier inputs to the pair of balanced mixers; and demodulation characteristic compensation means connected to demodulation output terminals of the pair of balanced mixers for deriving demodulation characteristics compensated orthogonal baseband input signals from the pair of quadrature amplitude demodulated signals; the demodulation characteristic compensation means including a pair of compensation signal generating circuits and a pair of addition circuits for adding demodulated signals from the pair of balanced mixers; the addition in each addition circuit in the pair being such that a value which is a function of one of the demodulated signals is added to the other of the demodulated signals.

DESCRIPTION OF THE PREFERRED EMBODIMENTS

An embodiment of the present invention will be described with reference to FIG. 6, as follows.

Figure 6:
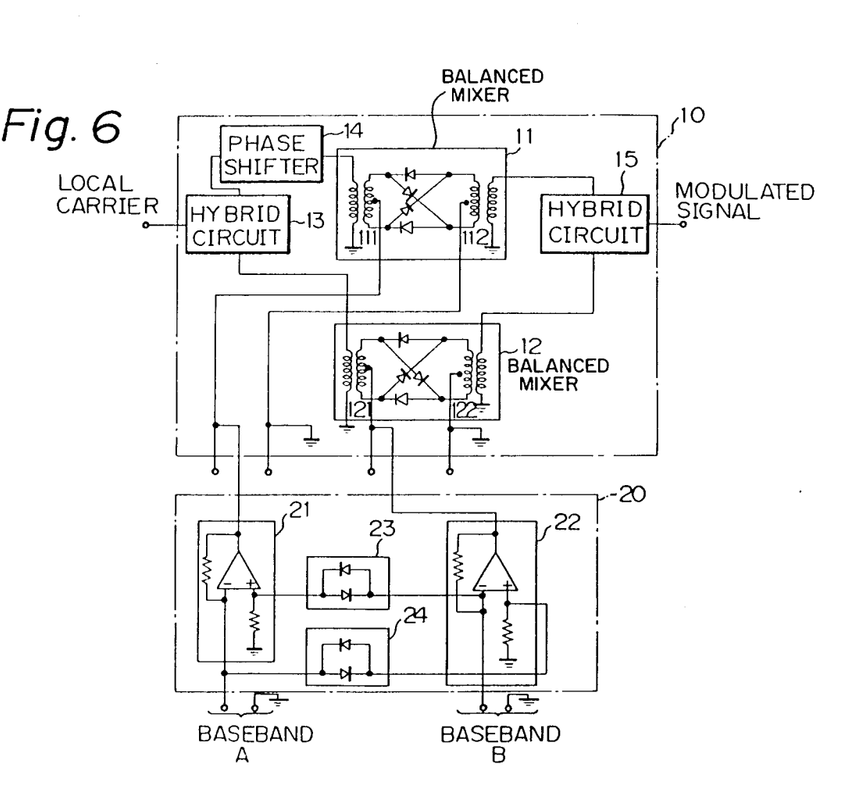
FIG. 6 is a circuit diagram of an embodiment for modulation of the present invention.

In FIG. 6, reference numeral 10 denotes a multi-level modulator, 21 and 22 adders, and 23 and 24 compensating signal generators.

In FIG. 6, 11 and 12 denote two sets of balanced mixers to which carrier waves are applied with or without phase shifting; 13 and 15 are hybrid circuits which combine or branch off any one terminal signal in the above-noted balanced mixers. A pair to each other orthogonal baseband inputs are applied to each of the other terminals to obtain a high frequency multi-level modulated wave from a hybrid circuit 15, and a high frequency multi-level modulated wave is applied to mixers 11 and 12 from the hybrid circuit 11 via a phase shifter 14 to obtain a pair of other orthogonal baseband outputs at each of the other terminals in the two sets of balanced mixers 11 and 12, thus constituting a modulating and demodulating device.

Reference numeral 20 denotes a characteristic compensating means in which a compensating signal is added, having an opposite polarity, to each of the baseband input signals A and B. The characteristics for compensating a non-linearity of the balanced mixers 11 and 12 is given to the compensating signal by the compensating signal generators 23 and 24, and accordingly, the non-linearity of the multi-level modulator 10 based on the non-linearity of the balanced mixers 11 and 12 is reduced.

A predetermined functional relationship is provided in the characteristic compensating means, which functional relationship corresponds to one of the baseband signals and the difference between each actual level and each ideal level of the other baseband signals. That is, with respect to an error (the difference between an actual level and an ideal level) of the signal after the other baseband signal (for example B) has been demodulated, the functional relationship of the error for one baseband signal (for example, A) can be investigated and measured beforehand.

It is more advantageous to use a circuit such as a compensating signal generator, which has an input/output characteristic of such a functional relationship. As a concrete example, a diode can be utilized which has a characteristic such that a current may be increased abruptly according to a rise of the applied voltage, since the greater the rate of increase of the above-noted error, the higher the level of the baseband signal.

In the circuit of FIG. 6, each compensating signal generator 23 and 24 is composed of diodes which are reversely connected therewith, and generates a compensating signal from a respective baseband input B, A according to a definite functional relationship. Each adder 21, 22 adds the compensating signal from the compensating signal generator 23, 24 to each baseband input A and B in an opposite phase to each other. The outputs of the adders 21 and 22 are applied to the neutral points of the balanced transformers 111, 112, 121 and 122 composing a respective balanced mixer 11, 12.

In the circuit of FIG. 6, a compensating signal will be added to each baseband input A and B in an opposite phase to each other. A compensating characteristic which can compensate for the non-linearity of the balanced mixer is provided in this compensating signal by the compensating signal generator 23 and 24, to compensate for the non-linearity of the multi-level modulator 10 based upon the non-linearity of the balanced mixers.

Figure 7:
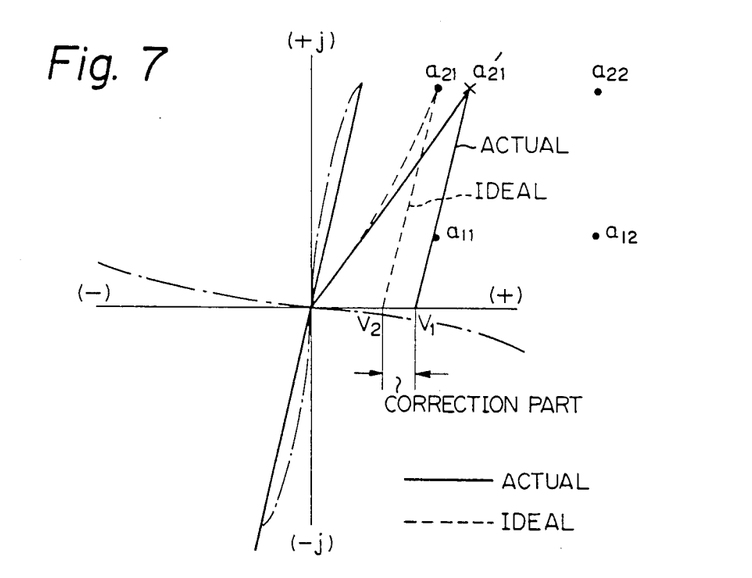
FIG. 7 is an explanatory diagram of an improvement of non-linear characteristics.

FIG. 7 is an explanatory diagram of the improvement of non-linear characteristics in accordance with the present invention. In FIG. 7, a first quadrant of the modulation characteristics shown in FIG. 5 is shown.

Assume that the signal point $a_{21}'$ is produced from the baseband inputs A and B. When the compensation of non-linearity is not carried out, the signal point $a_{21}'$ departs from a correct signal point $a_{21}$, based upon the non-linear modulation characteristics as shown by a chain line. The voltage of the baseband signal B must be $V_1$, in order to produce a correct signal point $a_{21}$ when a non-linear characteristic does not exist. In such a case, a point $a_{21}'$ is produced in practice, due to the non-linearity shown by the chain line in FIG. 7. The error is obtained by the other baseband signal A. Therefore, priority based on the baseband signal A, a signal compensating for the error is produced by the compensating signal generator 24 and then applied to the baseband signal B having opposite polarity, which is regarded as a signal $V_2$. Then, the signal point $a_{21}'$ is changed to an ideal point $a_{21}$.

The same compensation can be carried out with the other signal points $a_{11}$, $a_{12}$ and $a_{22}$. The same compensation is carried out on all signals within other quadrants, and as a result, it can be appreciated that the output characteristics of the modulator 10 are well within the ideal modulation characteristics as shown by large point marks in FIG. 5.

Figure 8:
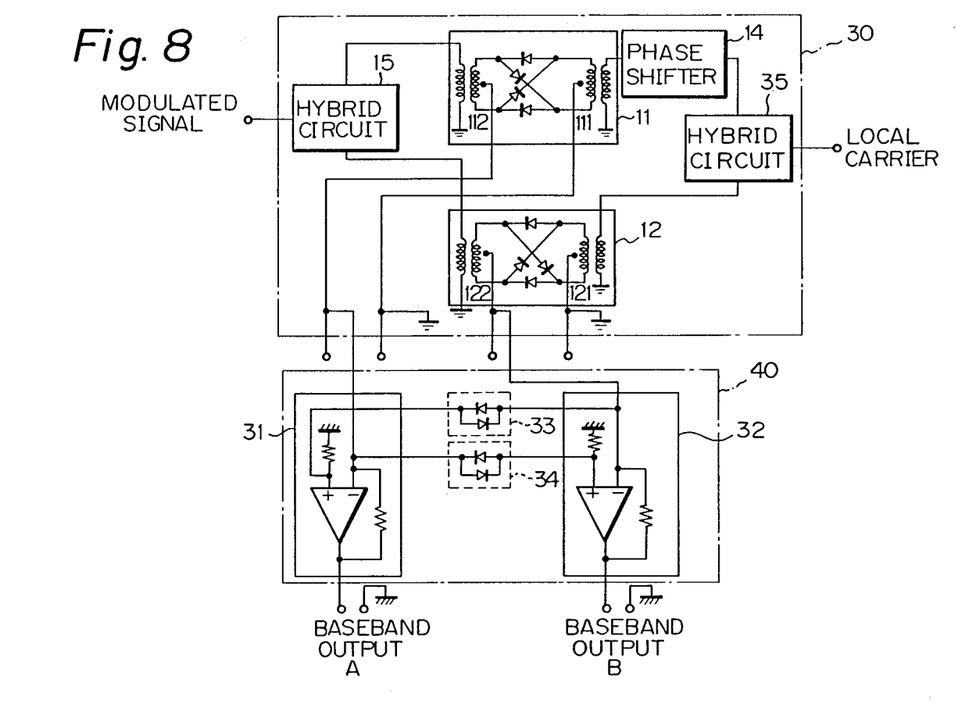
FIG. 8 is a circuit diagram of an alternative embodiment for demodulation of the present invention.

FIG. 8 shows another embodiment to which the present invention is applied. In FIG. 8, the same portions as in FIG. 1 are denoted by the same reference numerals. Reference numerals 30 denotes a multi-level demodulator, 31 and 32 adders, and 33 and 34 compensating signal generators.

In FIG. 8, the compensating signal generators 33 and 34 generate a compensating signal from a respective baseband output B and A in accordance with the functional relationship as described in relation to FIG. 6. The adders 31 and 32 add the compensating signals from the compensating signal generators 33 and 34, in an opposite polarity to the baseband outputs A and B (prior to compensation), to produce respective baseband outputs A' and B' (after compensation).

The balanced mixer shown in FIG. 1 is provided with a reversible feature, and therefore, it is obvious that the compensating method for non-linearity in accordance with the present invention may be applied to the demodulator in exactly the same way. From the circuit shown in FIG. 8, the baseband outputs B and A which are produced by demodulation of a high frequency multi-level modulated signal and are orthogonal to each other, are added at an opposite polarity to compensation signals generated from the baseband outputs A and B according to the above-noted functional relationship as shown in FIG. 6. The distortion of the baseband output of the multi-level demodulator, having a non-linearity characteristic, can thus be compensated to obtain a demodulated output having an ideal characteristic.

In the aforegoing respective embodiment, a 16-level QAM modulation/demodulation device has been described, but the modulation/demodulation device of the present invention can, of course, be applied to a multifarious further multi-level (for example, 64-value or 256 value multi-level) modulation/demodulation device, to improve the linearity thereof.

The compensating signal generator for producing the characteristic compensating signal according to the present invention is not limited to a device utilizing diodes as illustrated in the embodiment, but can be also applied to a device constituted by active elements such as transistors.

Furthermore, as a balanced mixer which forms a modulation/demodulation device, the present invention is not limited to the balanced mixer which combines plural diodes, as shown in FIG. 1, in that an alternative type of balanced mixer can be used to obtain the same effect.

I claim:

1. A modulation device for multiple level quadrature amplitude modulation, comprising:
    balanced mixer means for carrying out quadrature amplitude modulation and for providing a quadrature amplitude modulated signal;
    an input hybrid circuit, connected to carrier input terminals of said balanced mixer means, for supplying carrier inputs to said balanced mixer means;
    means for receiving digital baseband input signals; and
    modulation characteristic compensation means, connected to input terminals of said balanced mixer means, for supplying said balanced mixer means with said baseband input signals; said modulation characteristic compensation means comprising:
    a pair of addition circuit means; and
    a pair of compensation signal generating circuit means, connected between said pair of addition circuit means, for generating compensation signals,
    said pair of addition circuit means adding said baseband input signals and said compensation signals such that a value which is a function of one of said baseband input signals is added to another one of said baseband input signals.

2. A demodulation device for multiple level quadrature amplitude demodulation, comprising:
    balanced mixer means for carrying out quadrature amplitude demodulation and for providing a pair of quadrature amplitude demodulated signals;
    a first input hybrid circuit connected to first input terminals of said balanced mixer means for supplying modulated signals to said balanced mixer means;
    a second input hybrid circuit connected to second input terminals of said balanced mixer means for supplying carrier inputs to said balanced mixer means; and demodulation characteristic compensation means, connected to output terminals of said balanced mixer means, for deriving demodulation characteristic compensated baseband signals from said pair of quadrature amplitude demodulated signals said demodulation characteristic compensation means comprising:

a pair of addition circuit means; and a pair of compensation signal generating circuit means, connected between said pair of addition circuit means, for generating compensation signals, said pair of addition circuit means adding demodulated signals from said balanced mixer means such that a value which is a function of one of said demodulated signals is added to another one of said demodulated signals.

* * * * *